United States Patent Office 2,920,388
Patented Jan. 12, 1960

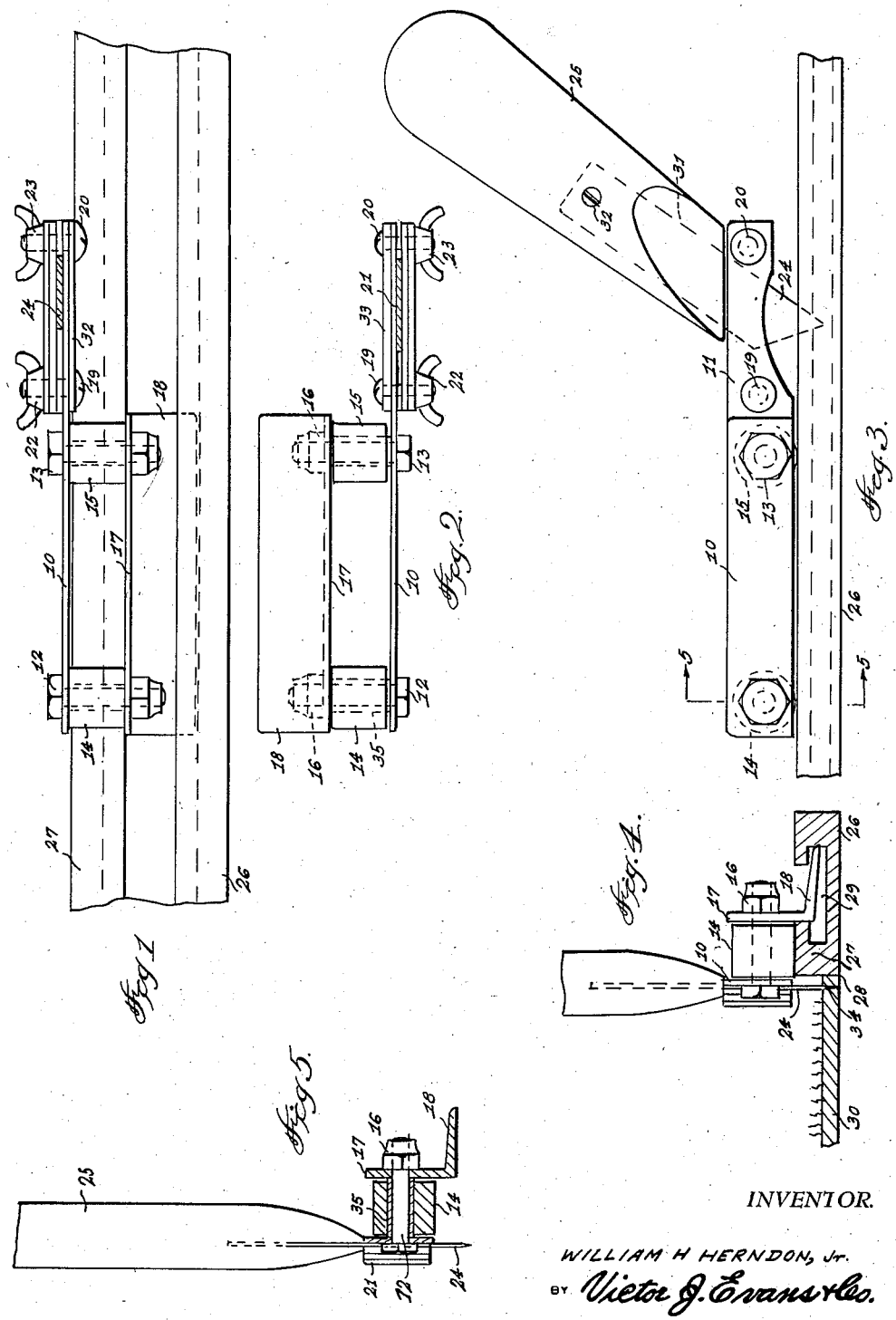

2,920,388

AIRCRAFT CARPET CUTTER

William H. Herndon, Jr., Miami, Fla.

Application October 7, 1958, Serial No. 765,883

1 Claim. (Cl. 30—293)

This invention relates to knives mounted in holders for cutting materials, and in particular a knife secured in a truck having rollers designed to travel on one side of a rail for mounting a seat in aircraft with an L-shaped guide bar positioned in the rail, and wherein drawing the knife by a handle extended therefrom cuts carpet on a line at one side of the rail, thereby making it possible for a single operator to cut and fit carpet for the floor of aircraft in a relatively short period of time.

The purpose of this invention is to provide means for holding a cutting blade in spaced relation to a rail for mounting a seat of aircraft whereby the carpet is accurately cut in a comparatively few minutes.

Aircraft carpet is shipped from the manufacturer in standard widths and the width is too wide to fit between the tracks or rails for holding the seats. The seats are removably mounted in the rails and when it is necessary to install new carpet the seats are removed and the carpet is secured to the floor between the mounting rails of the seats. It is necessary to cut the carpet accurately so that it will fit flush with the side surfaces of the mounting rails and it is difficult to lay out the positions of the rails on the carpet. With this thought in mind this invention contemplates a carpet cutting knife carried by a truck or dolly designed to travel on seat mounting rails of aircraft whereby with a guide angle of the truck extended into the rail the knife follows the side surfaces of the rail accurately cutting the carpet to correspond with the position of the rail.

The object of this invention is, therefore, to provide a carpet cutting knife that is mounted to travel in a path in circumjacent relation to an object around which the carpet is positioned whereby the edge of the carpet is in meeting relation with the object so that the carpet will have a neat and attractive appearance.

Another object of the invention is to provide a carpet cutter for aircraft in which the distance of a cutting knife from a mounting device is adjustable.

A further object of the invention is to provide a carpet cutter for aircraft that is designed to travel on seat mounting rails of the aircraft so that the carpet may be accurately cut to fit evenly around the rails in which the cutter is of simple and economical construction.

With these and other objects and advantages in view the invention embodies a vertically disposed longitudinally extended plate having rollers mounted thereon and extended from one side thereof with an extension at one end of the plate through which a knife blade may be clamped by screws with thumb nuts thereon and with an L-shaped angle bar suspended by bolts on which the rollers are mounted and positioned to travel in an elongated slot in a rail upon one side of which the rollers are positioned.

Other features and advantages of the invention will appear from the following description taken in connection with the drawing, wherein:

Figure 1 is a plan view of the improved aircraft carpet cutter showing the device positioned on a seat mounting rail of the aircraft.

Figure 2 is a view similar to that shown in Figure 1 looking upwardly toward the under surface of the cutter and with the rail omitted.

Figure 3 is a side elevational view of the improved aircraft carpet cutter showing the knife clamped in an extended end of the truck and in which the sharp edge of the knife is extended for cutting a carpet at one side of a seat carrying rail.

Figure 4 is an end elevational view of the carpet cutter showing the device positioned on a seat mounting rail with the rail and an edge of a carpet shown in section.

Figure 5 is a cross section through the carpet cutter taken on line 5—5 of Figure 3 also showing the cutting blade and angle shaped guide bar.

Referring now to the drawing wherein like reference characters denote corresponding parts the improved carpet cutter of this invention includes a plate 10 having an arm 11 extended from one end, bolts 12 and 13 mounted in the plate and extended therefrom, rollers 14 and 15 mounted on the bolts and retained in position by nuts 16, a guide having a vertically disposed arm 17 and a horizontally disposed leg 18 mounted on the bolts 12 and 13 and secured in position by the nuts 16, bolts 19 and 20 mounted in the arm 11 and having shims or spacing plates 21 positioned thereon, thumb nuts 22 and 23 threaded on the bolts 19 and 20 and a cutting blade 24 designed to be clamped between the plates 21 and having a handle 25 by which the blade may be drawn through carpet for cutting the carpet at the edge of a rail 26 on a section 27 of which the rollers 14 and 15 are positioned.

The cutter is patterned whereby the rollers 14 and 15 travel on the section 27 of the rail 26 with the knife 24 spaced from the outer surface 28 of the rail and with the horizontally disposed leg 18 of the guide bar extended into a slot 29 of the rail, as shown in Figure 4 whereby with the knife or blade 24 clamped between the plates 21 of the arm 11 the blade may be drawn through carpet 30 positioned on the floor between seat mounting rails, such as the rails 26.

The knife blade 24 is secured in a slot 31 in the handle 25 by a screw or pin 32 whereby the blade may be removed for sharpening and replaced.

The distance of the knife from the side surface 28 of the rail is adjusted by changing the positions of the shims or plates 21 on the bolts 19 and 20 of the arm 11.

In use, the blade 24 is clamped by the thumb nuts 22 and 23 to the arm 11, which may be provided with a backing bar 33 and with the rollers on the upper surface of the section 27 of the rail and the leg 18 of the guide bar in the slot 29 the truck is drawn along the rail with the knife 24 trimming the carpet 30 at the point 34 thereby providing a neat edge of the carpet and with the edge uniformly spaced from the side surface of the rail.

By this means a single operator may cut and accurately fit carpet on the floor of aircraft whereas with conventional cutting and fitting means four men are required.

The knife is actuated by drawing the knife forwardly and pressing downwardly thereon with the handle 25.

In this action the rollers travel freely on the upper surface of the section 27, rotating on the bolts 12 and 13 with the bolts extending through sleeves 35 in the rollers.

It will be understood that modifications, within the scope of the appended claim, may be made in the design and arrangement of the parts without departing from the spirit of the invention.

What is claimed is:

In a carpet cutter, the combination which comprises a vertically disposed elongated plate having an arm extended from one end, bolts positioned in spaced relation mounted in the plate and extended from one side thereof, rollers rotatably mounted on the bolts, an L-shaped guide bar positioned with a vertically disposed arm secured by nuts on extended ends of the bolts extended from the plate and having a horizontally disposed leg extended from the lower edge, bolts having thumb nuts thereon positioned in spaced relation and mounted in the arm extended from the plate, spacers on the bolts mounted in the arm, and a knife having a handle extended therefrom clamped by the thumb nuts of the bolts extended through the arm at one end of the plate between the spacers.

References Cited in the file of this patent

UNITED STATES PATENTS

| | | |
|---|---|---|
| 124,114 | Bright | Feb. 27, 1872 |
| 745,517 | Perks | Dec. 1, 1903 |
| 1,626,806 | Forry | May 3, 1927 |
| 1,798,250 | Galvin | Mar. 31, 1931 |
| 2,684,533 | Kern | July 27, 1954 |
| 2,772,474 | Hill et al. | Dec. 4, 1956 |